William J. Stark
Robert L. Wilcox      Inventors

By W.O. 7 Keilman  Attorney

May 3, 1960 W. J. STARK ET AL 2,935,723
MULTIPLE GEOPHONE CONNECTOR
Filed Nov. 9, 1956 3 Sheets-Sheet 2

William J. Stark
Robert L. Wilcox         Inventors

By W.A.Heilman Attorney

United States Patent Office 2,935,723
Patented May 3, 1960

2,935,723
MULTIPLE GEOPHONE CONNECTOR

William J. Stark and Robert L. Wilcox, Tulsa, Okla., assignors, by mesne assignments, to Jersey Production Research Company Application November 9, 1956, Serial No. 621,269

5 Claims. (Cl. 339—154)

The present invention relates to improved seismic exploration equipment and more particularly relates to an improved device for the interconnection of seismic detectors or geophones in suitable arrays.

Seismic methods of exploration are well known in the art and are widely used for carrying out geophysical investigations. In this type of exploration an explosive charge of dynamite or the like is detonated at or near the earth's surface to produce shock waves which travel downwardly into the earth and are at least in part reflected back to the surface as they encounter various subterranean formations. These reflected waves are detected by seismic detectors or geophones positioned on the surface and are converted into electrical impulses which can then be recorded as seismic traces. Interpretation and analysis of the traces thus produced yield much information as to the character and location of the substrata.

In order to obtain comprehensive seismic information, it is necessary that a number of separate traces be recorded simultaneously from points over a wide area surrounding the point at which the shot is detonated. Normally each of these traces is recorded from impulses obtained from several geophones connected in series, parallel or series-parallel to a single recorder in order to obtain stronger impulses, to compensate for or cancel out undesirable components and interference, and for other reasons. As many as 240 geophones may thus be interconnected in an array and positioned about the shot point.

Geophones are normally interconnected by means of numerous lines and cables strung over the ground and connected at many points. These connections are made by means of geophone clips attached to the end of one line and clipped onto a multiple-conductor cable at a terminal point prepared by making incisions in the cable and withdrawing the appropriate conductors which are then severed. Each end of the severed conductor is wired against the main cable with a length of Monel or equivalent metal wire to form a separate terminal. An insulating washer is inserted around the cable between the two terminals and the ends of the terminals are wrapped with tape to make one terminal wider than the other. Usually a short length of cable having multiple sets of terminals formed in this manner is used as an intermediate connector to which the lines from individual geophones are attached and this is in turn connected to a main transmission cable. Of course, the exact make-up of the connectors is determined by the particular type of array to be used. Great care must be exercised in making geophone connections in the above manner to assure that the connections are not grounded, that they are not short-circuited, and that they are made with the proper series, parallel or series-parallel arrangement. It has been found that the resistance to current leakage of connections of this type is quite low and that alternating current interference from power lines and similar installations is often encountered. The effect of this alternating current "pick-up" is much greater with series connections than with parallel connections and therefore, even though series connections result in greater geophone sensitivity, they are normally used only in areas where there is little or no danger of alternating current interference. These interference factors have made the setting up of seismic arrays difficult and have created numerous problems in the maintenance of seismic field transmission equipment, i.e. cables and connecting devices.

Devices for the interconnection of geophone lines and cables have been suggested from time to time heretofore but have not been widely used for various reasons. Seismic exploration is frequently carried out under extremely adverse conditions and cables are often strung over rocky terrain or through marshes and swampy areas. Connecting devices must therefore be rugged and capable of withstanding much abuse. They must be easily repaired in the field and should be adaptable to use in many different types of arrays. Because the prior devices have not proved wholly satisfactory in these respects, they have not met with general acceptance by the industry.

It is therefore an object of the present invention to provide an improved device for the connection of geophonic lines and cables by means of which seismic arrays can be quickly and easily set up and which will withstand considerable abuse under widely varying adverse field conditions.

Another object of the invention is to provide an improved multiple geophone connector by means of which geophone cable connections may be supported above the ground and which will effectively eliminate grounding, reversed polarity and short circuiting and minimize current leakage and interference.

A further objective of the invention is to provide an improved geophone connector which will permit ready rearrangement of the terminals thereon into any of a number of different type electrical connections.

Other objectives of the invention will be apparent from the description of the invention, the attached drawing and the appended claims.

The objectives of the present invention are achieved by providing an improved multiple geophone connector comprising an assembly of symmetrically arranged pairs of geophone terminal posts mounted upon an insulated support so that, by suitable inter-connection of the terminal posts, a plurality of geophone lines can be conveniently connected together at a common point in a predetermined arrangement and in turn connected to a main transmission cable by a pair of main take-off terminals. One terminal post in each pair is shorter than the other and insulating spacers are placed between the two to prevent reversed polarity and eliminate short circuits. The connector is mounted upon a base plate and all lines are supported above the ground at the connection point to increase resistance to current leakage and interference. The connector is sturdy, employs numerous interchangeable parts and can readily be produced in quantity.

The exact nature of the invention can perhaps be best understood by reference to the accompanying drawings, in which.

Figure 1:
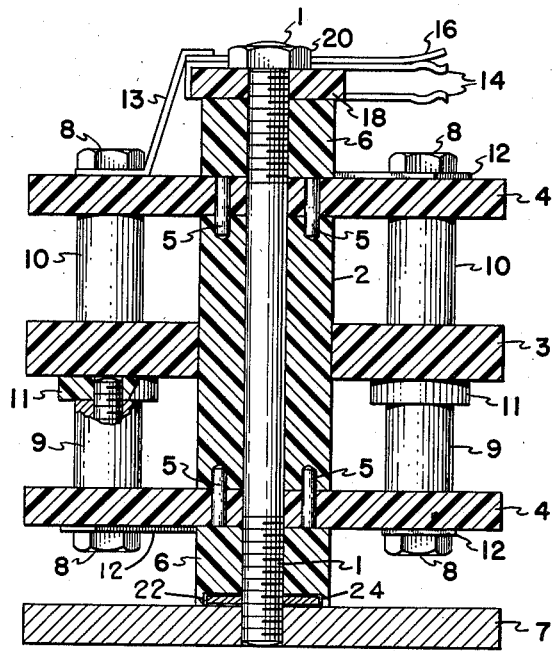
Figure 1 represents in sectional elevation a multiple geophone connector embodying the invention.

Referring now to Figure 1, the multiple geophone connector of the invention comprises a plurality of evenly spaced terminals assembled around a central supporting stud 1 which is threaded at each end and extends completely through the assembly. A central supporting cylinder 2 having an axial opening therethrough is positioned on stud 1. Cylinder 2 may be made of any suitable hard, electrically insulating material such as Bakelite, hard rubber, ebonite, plastic or the like. Linen Bakelite is preferred because of its high strength and excellent insulating properties. Other nonmetallic parts of the connector may be made of similar material. Positioned about the middle of cylinder 2 is an annular center spacer 3, which may be free to turn on cylinder 2, providing for cleaning action and for the easy installation of damping resistors and similar auxiliary equipment. At each end of cylinder 2 is a circular end plate 4 having a hole in the center thereof through which stud 1 extends and a plurality of holes spaced at equal intervals about the edge of the plate. The two end plates are identical and may be interchanged. Each of the end plates is keyed to cylinder 2 by two orienting pins 5 which extend through holes in the end plate into corresponding holes in the end of the cylinder and thus prevent the end plates from rotating with respect to each other. Locking nuts 6 are threaded onto each end of stud 1 and hold the end plates 4 firmly against cylinder 2. These nuts cover the holes in each end plate containing the orienting pins 5 and retain the pins in place. Attached to the lower end of stud 1 below the lower locking nut 6 is a circular base plate 7. Plate 7 is threaded onto the stud and a lock washer 22 may be placed between the locking nut and the base plate to assure that the plate does not work loose. A circular recess 24 in the base plate may be provided for the lock washer to permit the plate to fit flush against the lower nut 6.

Metallic cap screws 8 extend through the holes spaced about the edge of each of the end plates 4 to the center spacer 3 and support the terminal posts of the connector, which are adapted to fit the contacts of a conventional type geophone clip. The terminal posts are tubular metallic members fitted with internal threads matching those of the cap screws and, like the cap screws, may be made of steel, brass, aluminum or other metal. Brass is preferred because of its high electrical conductivity, its hardness and its resistance to corrosion. The terminal posts are disposed vertically in pairs, one on either side of center plate 3, and are of two different lengths, a short terminal post 9 and a long terminal post 10 forming a pair. A circular insulating spacer 11 is positioned between each short terminal post 9 and the center spacer 3. The combined length of a short terminal post 9 and a spacer 11 is the same as the length of a long terminal post 10. The cap screws 8 are threaded through the terminal posts and the spacers 11 and hold them in position between center spacer 3 and end plate 4.

Figure 2:
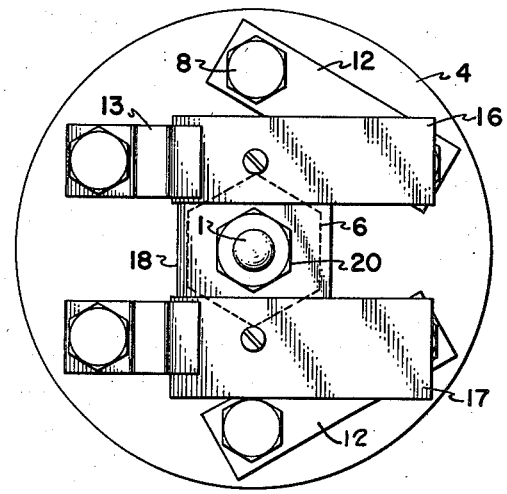
Figure 2 depicts a vertical view of the connector shown in Figure 1.
Figure 4:
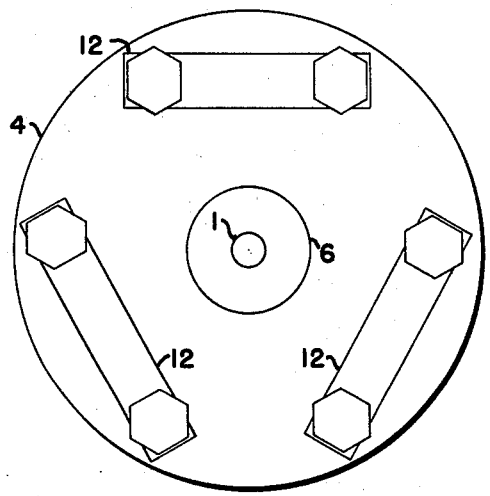
Fig. 4 depicts a view of the lower side of the lower circular end plate.

As can be more clearly discerned from Figure 2, the cap screws and terminal posts are spaced at equal intervals around the edge of the connector. Although six pairs of terminal posts are shown in the drawings, it will be understood that in some cases a greater or lesser number of terminals may be desirable and that the size of the connector may be varied to provide for any necessary number of terminals. The terminal posts as shown in the drawings are arranged so that alternate pairs are inverted, the short terminal post and spacer being above the center plate in one pair and below in the next, and adjacent pairs are connected alternately at the top and bottom by conducting straps or conductors 12 positioned on the upper surface of the upper end plate and the lower surface of the lower end plate. The conducting straps are preferably flat strips of brass having a hole in each end to permit their being held in place by cap screws, although other metallic conductors may be used. As shown in the drawings the terminal posts are connected in series between two adjacent cap screws on the upper end plate and thus there are two conductor straps on the upper plate and three on the lower. It will be understood, however, that the conductor straps and terminal posts may be rearranged for connections other than the series connection shown. In Fig. 4, the conductor straps 12 and terminal post arrangement are illustrated as utilized in a series connection.

The two adjacent cap screws on the upper end plate between which the terminal posts are connected in series are in turn connected to the main take-off terminals of the connector by means of metallic strips 13 held in place by the cap screws. Holes are provided in the strips through which the screws may be inserted. The take-off terminals consist of a set of narrow contacts 14 and a set of wide contacts 15 and are adapted to be connected to a main transmission line having terminal points prepared in the conventional manner. Use of the connector thus does not require the preparation of new transmission lines. Each set of contacts preferably comprises dual vertically aligned cantilever arms having opposed concave contacting surfaces at the extremities thereof. The contacts of the take-off terminals are assured of a positive connection by means of backing strips 16 and 17 which bear against the upper contacts. The contacts and backing strips are mounted upon an insulating support 18 by means of screws 19 and corresponding nuts which are not shown. Support 18 has a hole through the center thereof and is held in position above the upper locking nut 6 upon stud 1 by nut 20.

Figure 5:
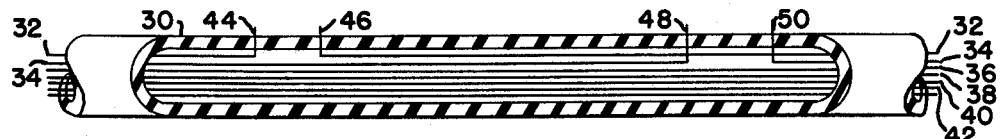
Fig. 5 illustrates a partial cutaway longitudinal view of a transmission cable.

In Fig. 5 there is illustrated a partial cutaway longitudinal view of a transmission cable which has outer shield 30 and inner insulated conductors or wires 32, 34, 36, 38, 40, and 42. It is of course understood that the transmission cable may contain a much greater or a smaller number of internal conductors. At the approximate point where it is desired to attach the multiple geophone connector, entrance is made through the outer covering 30 of the transmission cable. Inner wire 32 is severed with ends 44 and 46 being extended or bent in a manner so as to extend for a very short distance from the outer wall of shield 30 as shown in Fig. 5. Inner conductor 34 is likewise severed and is bent so that the ends 48 and 50 protrude as shown from the transmission cable. The distance from the point where line 32 is severed and the point where line 34 is severed will, of course, depend upon the distances between contacts 14 and 15 of the geophone connector.

Figure 6:
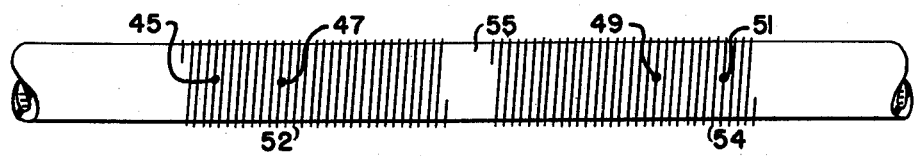
Fig. 6 illustrates external windings about the transmission cable.
Figure 7:
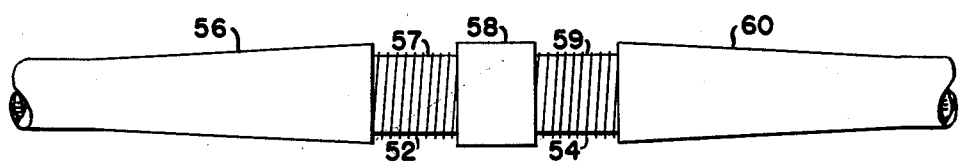
Fig. 7 illustrates contacts in a built-up portion of the transmission cable to receive take-off terminals from the geophone connector.

As can be seen in Fig. 6, ends 44 and 46 are soldered at 45 and 47, respectively, to wire 52 or other conductor which is wrapped about the exterior wall of the transmission cable for a distance of about two or three times the length of contact 14. Likewise ends 48 and 50 of inner conductor 34 are soldered at 49 and 51, respectively, to a conductor or wire 54 which is wound about outer shield 30 of the transmission cable for a distance of approximately two or three times the width of the contact 15. An unwound portion 55 of the cable remains between windings 52 and 54 and is the width of the distance between contacts 14 and 15. A rubber annular mold 58 is molded about the unwound portion 55 of the transmission cable. A rubber mold 56 is fabricated about windings 52 terminating at one end a distance from mold 58 to form recess 57 which is the approximate width of contact 14. Mold 60 is fabricated about windings 54 terminating at one end and leaving recess 59, the approximate width of contact 15, between the molding and the shoulder of mold 58. Molds 56 and 60 completely enclose all of windings 52 and 54 except those portions exposed in recesses 57 and 59, respectively. Recesses 57 and 59 are thus adapted to receive clips 14 and 15. Clip 14 is thus electrically connected through windings 52 to enter wire 32 and clip 15 is likewise electrically connected through windings 54 to enter wire 34.

Figure 3:
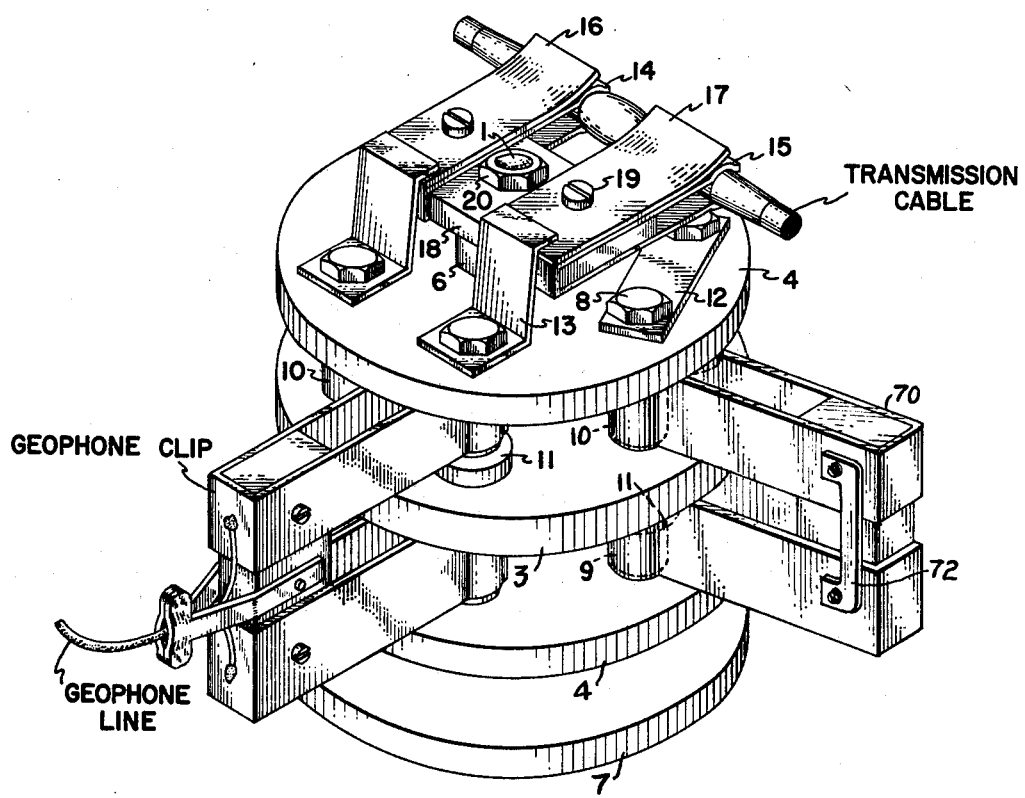
Figure 3 shows in isometric detail a multiple geophone connector having connected thereto a geophone line and a transmission line.

In interconnecting a plurality of geophones by means of the connector, conventional geophone clips attached to geophone lines are attached to the terminal posts as shown in Figure 3. For simplicity, only one geophone clip is shown in the drawing but other clips may be attached in similar manner. If geophones are not to be connected to all of the terminals and a bridge is necessary in order to make a complete circuit, such a bridge may be prepared by simply wiring across the contacts of an unused geophone clip and attaching the clip to the unused terminals. How this may be done is illustrated in Fig. 3 in which geophone clip 70 is unused and is bridged by bridge member 72. Such bridges would obviously be unnecessary in the case of some connections even though all of the terminals are not used. The combined geophones are connected to a transmission cable by means of the terminals at the top of the connector as is also shown in Figure 3. The terminals on the transmission line may be any type designed for use with conventional clips and thus the connector may be readily incorporated into existing seismographic equipment inventories.

It will be appreciated that numerous modifications may be made in the connector shown without departing from the scope of the invention. The connectors may be made of any convenient size and may be equipped with any desired number of terminal posts. Alligator or similar type clips may be utilized for attaching the connector to a transmission cable in place of the main transmission clips shown. A spike for insertion in the ground may serve to support the connector in lieu of the base plate shown. Numerous other modifications will be apparent to those skilled in the art and therefore it is intended that the invention be limited only by the scope of the appended claims.

What is claimed is:

1. An electrical connector assembly comprising a central member, transverse plates of insulating material attached to each end of said central member, an insulating transverse spacer positioned on said central member between said plates, a plurality of metallic terminal posts positioned between each of said plates and said spacer in vertically aligned pairs spaced around said central member with each post of each aligned pair separated vertically from each other by said transverse spacer, a pair of metallic clips, means electrically connecting said clips with preselected posts, conductor means for electrically connecting pre-selected terminal posts on each said plate, and means for supporting said assembly.

2. A connector for connecting a plurality of geophone clips to a transmission cable comprising an elongated member of electrical insulating material, transverse plates of insulating material positioned at each end of said elongated member, a support member retaining said plates in position on said elongated member, an insulating transverse spacer positioned on said elongated member between said plates, a plurality of metallic terminal posts positioned between each of said plates and said spacer in vertically aligned pairs evenly spaced around said elongated member with each post of each aligned pair separated vertically by said transverse spacer, means connecting said terminal posts to said plates, means for electrically connecting pre-selected terminal posts on each of said plates, a pair of metallic clips supported in spaced-apart relationship above the uppermost of said plates by said support member, conductors electrically connecting each of said clips to preselected terminal posts, and a base connected to said support member below said plates.

3. A connector as defined in claim 2 wherein one of said terminal posts in each pair is shorter than the other and is separated from said spacer by an insulating washer having a diameter greater than that of said terminal posts.

4. A connector as defined in claim 3 wherein each of said metallic clips has dual vertically aligned cantilever contact members with opposed concave contact surfaces at the extremities thereof.

5. A connector for connecting a plurality of geophone clips to a transmission cable comprising a pair of circular insulating plates; an insulating cylindrical member separating said plates axially; means for securing said plates to said cylindrical member; metallic terminal posts mounted perpendicular to the inner face of each of said plates in a circular pattern, said posts on each plate being aligned with those on the opposing plate; an insulating annular spacer carried on said cylindrical member and separating said terminal posts on each plate from said posts on the opposing plate; conductors mounted on said plates electrically connecting preselected terminal posts on each plate; a pair of metallic clips mounted in spaced-apart relationship above the uppermost of said plates on said securing means, each of said clips having dual vertically aligned cantilever contact members with opposed concave contact surfaces at the extremities thereof; conductors electrically connecting each of said clips with a preselected terminal post attached to the uppermost of said plates; and a support member mounted below the lowermost of said plates.

References Cited in the file of this patent

UNITED STATES PATENTS

| | | |
|---|---|---|
| 1,984,998 | Soreny | Dec. 18, 1934 |
| 2,283,040 | Brinkmann et al. | May 12, 1942 |
| 2,407,695 | Washcoe | Sept. 17, 1946 |

OTHER REFERENCES

Lawsonn, A.A. Electrical Mfg., October 1954, pages 134, 135.